United States Patent
Kida

(10) Patent No.: US 6,356,722 B1
(45) Date of Patent: Mar. 12, 2002

(54) COOLING SYSTEM WITH MOTOR/DUCT CONFIGURATION FOR AN ELECTRONIC APPLIANCE

(75) Inventor: Hiroshi Kida, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/511,511

(22) Filed: Feb. 23, 2000

(30) Foreign Application Priority Data

Mar. 12, 1999 (JP) .......................................... 11-066315

(51) Int. Cl.$^7$ .............................................. G03G 21/20
(52) U.S. Cl. ........................................................ 399/92
(58) Field of Search ............................... 399/92, 93, 91, 399/320, 355, 250; 361/687, 694; 347/152, 138

(56) References Cited

U.S. PATENT DOCUMENTS

| | | | | |
|---|---|---|---|---|
| 4,695,151 A | * | 9/1987 | Watanabe | 399/92 |
| 4,720,727 A | * | 1/1988 | Yoshida | 399/93 |
| 5,038,170 A | * | 8/1991 | Serita | 399/92 |
| 5,245,385 A | * | 9/1993 | Fukumizu et al. | 399/91 |
| 5,708,938 A | * | 1/1998 | Takeuchi et al. | 399/250 |
| 5,887,226 A | * | 3/1999 | Taki | 399/92 |
| 5,907,745 A | * | 5/1999 | Azuma et al. | 399/92 |
| 5,966,286 A | * | 10/1999 | O'Connor et al. | 361/687 X |

FOREIGN PATENT DOCUMENTS

JP 04257880 9/1992

* cited by examiner

*Primary Examiner*—Sophia S. Chen
*Assistant Examiner*—Hoan Tran
(74) *Attorney, Agent, or Firm*—Renner, Otto, Boisselle & Sklar

(57) ABSTRACT

A cooling system for an electronic appliance is configured so as to include a duct made up of a high thermally conductive material over a fixing unit as a high-temperature unit, part of a laser writing unit being inserted into the duct, and a fan for creating an air flow inside the duct. With this configuration, heat arising from the laser writing unit is discharged outside by virtue of the air flow to cool the laser writing unit while the laser writing unit is arranged so as not to directly oppose the fixing unit, to thereby prevent temperature rise of the laser writing unit due to heat arising from the fixing unit. Further, the fixing unit is arranged so as not to be in direct contact with the air flow, hence no heat more than needed will be removed from the fixing unit, thus making it possible to keep the fixing unit at the predetermined high-temperature state.

5 Claims, 18 Drawing Sheets

COOLING SYSTEM WITH MOTOR/DUCT CONFIGURATION FOR AN ELECTRONIC APPLIANCE

BACKGROUND OF THE INVENTION (1) Field of the Invention

The present invention relates to a cooling system for discharging the air heated in an electronic appliance having a heat source therein, such as an image forming apparatus using electrophotography.

(2) Description of the Prior Art

An image forming apparatus using electrophotography as an electronic appliance, typically includes a fixing unit for heating and fixing the toner image having transferred onto print media, a motor for the optical scanning device for recording a static latent image on the photoreceptor by scanning and other heat generating units.

In recent years, miniaturization of electronic appliances has been developed in order to minimize the space and footprint for installation. As a result, spaces between units inside the electronic appliance become narrower and adjacent units are designed so as to be laid out close to each other. This leads to a bad flow of air within the electronic appliance and hence to buildup of generated heat therein, thus raising the temperature of the electronic appliance as a whole.

Some units incorporated in an electronic appliance may lose their functions due to an elevated temperature. For example, in an image forming apparatus, a number of optical elements making up an optical scanning unit are laid out in the predetermined positional relationship with each other. In this system, if the positional relationship between these optical elements varies due to temperature variation, the image of light to be written on the photoreceptor will distort, making it impossible to produce a correct reproduction of an image.

To deal with such a situation, Japanese Patent Application Laid-Open Hei 4 No.257880 as a conventional example of an electronic appliance, has disclosed a configuration in which a cooling system for discharging the heat generated from heat generating units therein is provided so as to eliminate the influence of the heat upon the surrounding units.

However, some electronic appliances, such as an image forming apparatus having a fixing unit and an optical scanning unit, can include both a high-temperature unit to be maintained at a predetermined high-temperature state and a low-temperature unit which needs to be absolutely prevented from rising in temperature. In such an electronic appliance, it is necessary to prevent the high-temperature unit from being cooled more than needed while preventing the low-temperature unit from being affected by heat. However, there has been no conventional cooling system which can both maintain the high-temperature state in the high-temperature unit and prevent the rise in temperature of the low-temperature unit. Thus, conventional configurations have suffered from the problem of a number of units arranged in the electronic appliance failing to reliably exhibit their individual functions.

SUMMARY OF THE INVENTION

It is therefore an object of the present invention to provide a cooling system for an electronic appliance which can prevent the high-temperature unit, to be maintained at a high-temperature state, from being cooled more than needed while reliably preventing the low-temperature unit, to be absolutely prevented from temperature rise, from being affected by heat, and which permits multiple number of units to reliably exhibit their individual functions.

The present invention has been devised in order to achieve the above object, and the present invention is configured as follows:

In accordance with the first aspect of the present invention, a cooling system for an electronic appliance comprises: a high-temperature unit to be maintained in a predetermined high temperature state; a low-temperature unit to be kept from temperature rise; and a duct having an air flow passage for exhaust only created therein, and is characterized in that the whole or part of the duct is arranged between the high-temperature unit and the low-temperature unit.

In accordance with the second aspect of the present invention, the cooling system for an electronic appliance having the above first feature is characterized in that the low-temperature unit includes a heat source and at least the heat source of the low-temperature unit is exposed to the interior of the duct.

In accordance with the third aspect of the present invention, the cooling system for an electronic appliance having the above first feature is characterized in that the low-temperature unit includes a heat source and at least the heat source of the low-temperature unit is placed in contact with part of the duct.

In accordance with the fourth aspect of the present invention, the cooling system for an electronic appliance having the above first feature is characterized in that at least the portion of the duct, opposing a heat source of the low-temperature unit is formed of a high thermally conductive material.

In accordance with the fifth aspect of the present invention, the cooling system for an electronic appliance having the above third feature is characterized in that the duct has a top surface having a depressed portion into which the heat source projected downward from the bottom surface of the low-temperature unit is fitted from above.

In accordance with the sixth aspect of the present invention, the cooling system for an electronic appliance having the above third feature is characterized in that the duct has an upper interior surface having a radiating portion on the inner side thereof corresponding to the area opposing the heat source of the low-temperature unit.

In accordance with the seventh aspect of the present invention, the cooling system for an electronic appliance having the above first feature is characterized in that a radiating portion is formed on an interior surface perpendicular to the air flow passage inside the duct and the high-temperature unit and low-temperature unit are arranged in the direction perpendicular to the air flow passage with the duct interposed therebetween.

In accordance with the eighth aspect of the present invention, the cooling system for an electronic appliance having the above first feature is characterized in that an insulating portion is disposed between the duct and the high-temperature unit.

In accordance with the ninth aspect of the present invention, the cooling system for an electronic appliance having the above first feature is characterized in that the duct constitutes part of a frame supporting the units including the high-temperature unit and low-temperature unit.

In accordance with the tenth aspect of the invention, the cooling system for an electronic appliance having the above ninth feature is characterized in that at least part of the duct and frame is composed of a high thermally conductive material.

In the above first configuration, the high-temperature unit to be maintained in a predetermined high temperature state and the low-temperature unit to be kept from temperature rise are separated by the whole or part of the duct having an air flow passage for exhaust only created therein. Therefore, heat arising on the low-temperature unit side from the high-temperature unit is absorbed by the air passing through the air flow passage inside the duct and discharged therethrough, so that no heat will transmit to the low-temperature unit. Further, since the high-temperature unit is not in direct contact with the exhaust air, no heat will be removed from the high-temperature unit through the exhaust air.

In the above second configuration, at least the heat source of the low-temperature unit comes into contact with the exhaust air passing through the air flow passage created inside the duct. Therefore, heat arising from the heat source in the low-temperature unit is absorbed by the exhaust air and discharged thereby, so that no temperature rise will occur in the low-temperature unit. Further, the heat source as well as the areas to which heat from the heat source is transmitted can be brought into contact with the exhaust air passing through the air flow passage inside the duct, thus making it possible to reliably cool the low-temperature unit.

In the above third configuration, heat arising from a heat source in the low-temperature unit is absorbed via part of the duct by the exhaust air passing through the air flow passage created inside the duct and discharged thereby. Accordingly, heat arising from the heat source will not raise the temperature in the low-temperature unit. The duct defining the air flow passage for exhaust can be also be used as a supporting element for the low-temperature unit. Therefore, it is possible to cool the low-temperature unit by letting the exhaust air absorb the heat arising from the heat source in the low-temperature unit via part of the duct while realizing a simple supporting structure of the low-temperature unit.

In the above fourth configuration, heat arising from the heat source in the low-temperature unit is absorbed via the high thermally conductive portion of the duct by the exhaust air passing through the air flow passage created inside the duct and discharged thereby. Accordingly, heat arising from the heat source is efficiently absorbed by the exhaust air.

In the above fifth configuration, the heat source of the low-temperature unit is located in the depressed portion formed on the top surface of the duct. Accordingly, the whole surface of the area of the heat source exposed from the bottom surface of the low-temperature unit is placed opposite to the inner surface of the depressed portion formed on the top surface of the duct. Therefore, heat arising from the heat source can be efficiently absorbed via the depressed portion of the duct by the exhaust air.

Since the depressed portion into which the heat source of the low-temperature unit is accommodated has an inclined surface on the side opposing the exhaust air passing through the air flow passage, the exhaust air can be smoothly passed through the air flow passage without the flow of exhaust air in the air flow passage being obstructed. Since the cross section of the portion opposing the heat source of the low-temperature unit is reduced in the air flow passage, the velocity of flow of the exhaust air in this position increases, leading to efficient cooling of the heat source.

In the above sixth configuration, heat transmitted from a heat source of the low-temperature unit to the upper portion of the duct is absorbed via the radiating portion by the exhaust air. Accordingly, the heat transmitted to the top surface of the duct is efficiently absorbed by the exhaust air.

In the above seventh configuration, in the interior of the duct located between the high-temperature unit and the low-temperature unit, a radiating portion is formed on the surface parallel to the direction of the arrangements of the high-temperature unit and the low-temperature unit. Therefore, heat transmitted from the high-temperature unit to the duct whilst being transmitted from the high-temperature unit side to the low-temperature unit side in the duct, is absorbed via the radiating portion by the exhaust air, so that no heat will transmit to the low-temperature unit via the duct.

In the above eighth configuration, the insulating portion stops conduction of heat arising from the high-temperature unit to the duct. Therefore, no heat from the high-temperature unit will be absorbed via the duct by the exhaust air and discharged thereby.

Also, conduction of the heat arising from the high-temperature unit to the exhaust air passing through the air flow passage in the duct can be stopped by the portion of the duct on the high-temperature unit side, thus preventing reduction in temperature of the high-temperature unit. Further, there is no need to provide an extra insulating element between the high-temperature unit and the duct, thus making it possible to realize a compact configuration.

In the above ninth configuration, part of the frame is configured by the duct. Therefore, the frame supporting the units including the high-temperature unit and low-temperature unit is reinforced by the duct thus eliminating part of the elements constituting the frame.

In the above tenth configuration, the units including the high-temperature unit and low-temperature unit are supported by the duct and the frame, which are, at least, partially composed of a high thermally conductive material. Therefore, excessive heat arising from the high-temperature unit and from the low-temperature unit will efficiently transmit to the duct and the frame.

DESCRIPTION OF THE PREFERRED EMBODIMENTS

Figure 1:
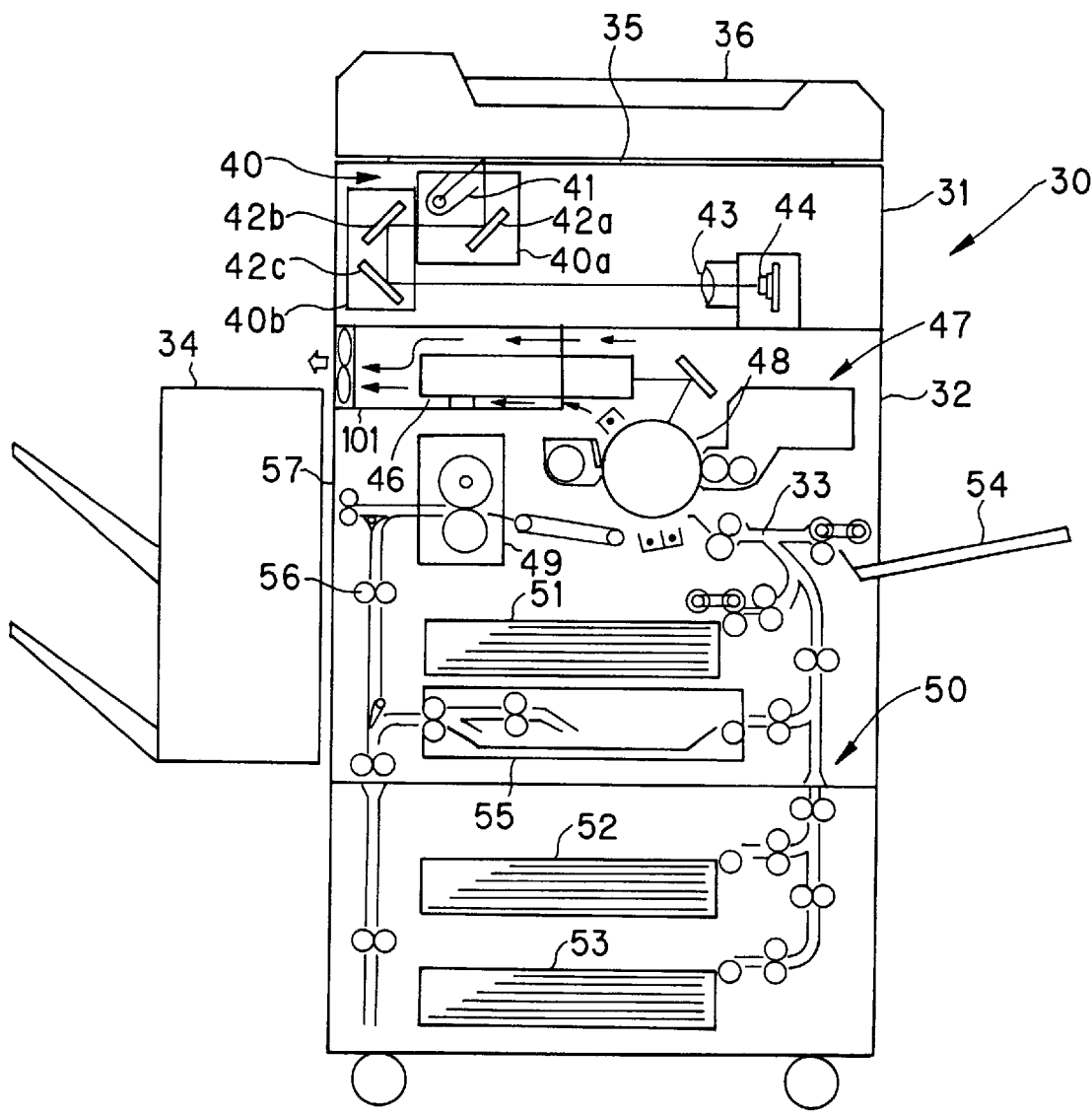
FIG. 1 is a schematic front sectional view showing a configuration of a digital copier as an electronic appliance to which a cooling system in accordance with the embodiment of the present invention is applied.

The description of the present invention will hereinafter be made through a digital copier as an electronic appliance to which a cooling system according to the embodiment is applied. FIG. 1 is a schematic front sectional view showing a configuration of a digital copier. This digital copier, designated at 30, is configured of a scanner portion 31 and a laser recording portion 32. This laser recording portion 32 is composed of an image recording portion 47 located in the upper part thereof and a paper feed portion 50 located in the lower part thereof.

Scanner portion 31 is configured of a transparent glass element or original table 35, a reversing automatic document feeder (RADF) 36 for feeding original documents onto original table 35; and a scanner unit 40 for reading the image of the original placed on original table 35. RADF 36 feeds documents from the original tray on which one or multiple documents are placed and delivers them one by one, so that one side or both sides of the fed document will oppose original table 35, in accordance with a selection. Scanner unit 40 includes: a lamp 41 for illuminating the image surface of the original placed on original table 35; mirrors 42a to 42c constituting the optical path of the light emitted from lamp 41 and reflected by the image surface of the original; a mirror base 40a having lamp 41 and mirror 42a mounted thereon and reciprocating in the auxiliary direction at a predetermined speed along the undersurface of original table 35; a mirror base 40b having mirrors 42b and 42c mounted thereon and reciprocating in the auxiliary direction at half the speed of mirror base 40a along the undersurface of original table 35; a photoelectric converting device (CCD) 44 receiving the reflected light from the image surface of the original to output an electric signal corresponding to the intensity of the received light; and a lens 43 for focusing the reflected light from the image surface of the original onto the light receiving surface of CCD 44.

Scanner portion 31 picks up the image of the original being fed onto original table 35 by the operation associated with RADF 36 and scanner unit 40, sequentially line-wise in the main scan direction and supplies it as the image data to an unillustrated image processing portion. The image processing portion undergoes the predetermined image processes for the image data and then outputs it as the drive data for a semiconductor laser to an aftermentioned laser writing unit 46.

Image recording portion 47 located in the upper part in laser recording portion 32 includes a laser writing unit 46 and a process unit 48 and a fixing unit 49. Laser writing unit 46 includes: a semiconductor laser for emitting a laser beam modulated based on drive data; a polygon mirror for deflecting the laser beam emitted from the semiconductor laser in the main scan direction and an f-theta lens for equi-angularly deflecting the laser beam, reflected by the polygon mirror, onto the surface of the photoreceptor drum. The laser writing unit drives the semiconductor laser based on the drive data output from the image processing portion so as to emit the light carrying the image in accordance with the image data and irradiate the surface of photoreceptor drum, scan-wise in the main scan direction through the polygon mirror and f-theta lens.

Process unit 48 is configured of a photoreceptor drum having a photoconductive layer on the surface thereof, a charger, a developing device, a transfer device, a cleaning device and an erasing device, arranged around the photoreceptor drum. The surface of the photoreceptor drum rotating at a constant speed has been uniformly charged with electric charge of a single polarity by the charger prior to exposure of the laser beam from laser writing unit 46. Charge located at areas exposed to the laser beam is selectively released by photoconductive effect so as to from a static latent image. This static latent image is visualized with the developer supplied from the developing device into a developer image. The developer image is transferred to the paper surface by the transfer device. The photoreceptor drum surface having passed by the position opposed to the transfer device is removed of the residual developer by the cleaning device and then is removed of the residual electricity by the erasing device so as to allow repeated use for the process comprising the steps of charging by the charger, exposing with the laser beam, developing by the developing device, transferring by the transfer device and refreshing by the cleaning device and erasing device.

Fixing unit 49 includes a heat roller having a heater lamp therein and a pressing roller abutted on the heat roller with a predetermined nipping pressure. The paper with a developer image transferred thereon after having passed through process unit 48 is heated and pressed whilst passing through the nip between the heat roller and pressing roller so that the developer image is fused and fixed on the paper surface.

Paper feed portion 50 includes paper feed cassettes 51 to 53 holding sheets of paper therein, a manual feed tray 54 on the top of which the paper is stacked, an intermediate tray 55 for holding the sheet selectively inverted after having passed through fixing unit 49 and a paper conveyance path 33 defined from paper feed portion 50 to a paper discharge port 57 by way of process unit 48. Paper feed portion 50 conveys a sheet of paper fed from paper feed tray 51–53, manual feed tray 54 or intermediate tray 55, along paper conveyance path 33, in synchronization with the rotation of the photoreceptor drum. Paper feed portion 50 discharges the paper having passed through fixing unit 49 out through discharge port 57 when one-sided copy mode is selected. When duplex copy mode is selected, the paper feed portion inverts the paper with an image formed on one side thereof upside down and conveys it into intermediate tray 55. Further, in a multiple or superimposition copy mode, one sheet of paper is conveyed into process unit 48 circulating it through intermediate tray 55 by the predetermined number of times.

On the side where paper discharge port 57 of digital copier 30 is arranged, a post-processing unit 34 is mounted. Post-processing unit 34 has a multiple number of paper output trays for accommodating the sheets output from paper discharge port 57 and performing punching and/or stapling for the sheets with images formed thereon.

In a digital copier 30 thus configured, fixing unit 49 for fusing the developer image having transferred to the sheet surface is the high-temperature unit in the present invention, that is, the temperature of this unit is raised to the predetermined temperature by the heat generating element or heater lamp accommodated in the heat roller.

On the other hand, the position of the illuminated spot of the laser beam from laser writing unit 46 on the photoreceptor drum surface affects the reproducibility of the image data in the developer image and varies depending upon the relative positional relationship between optical elements constituting the optical path of the laser beam, i.e., the semiconductor laser, polygon mirror, f-theta lens and photoreceptor drum. Accordingly, in order to obtain a highly reproducible copy image, it is necessary to prevent variations of the mounted positions of the semiconductor laser, polygon mirror and f-theta lens in laser writing unit 46 due to change in temperature. The motor for driving the polygon mirror at a high rotational rate is a heat source which generates heat by electrical resistance of the coil and frictional resistance at the rotational part and the degradation of the motor due to abrasion etc., will be accelerated by temperature rise. Therefore, in order to maintain the smooth, stable rotation of the polygon mirror and hence to keep beneficial reproducibility of the copy image, the motor needs to be cooled. From this viewpoint, laser writing unit 46 including a semiconductor laser, polygon mirror, f-theta lens and motor is the low-temperature unit in the present invention, that is, a target to be cooled.

Figure 2:
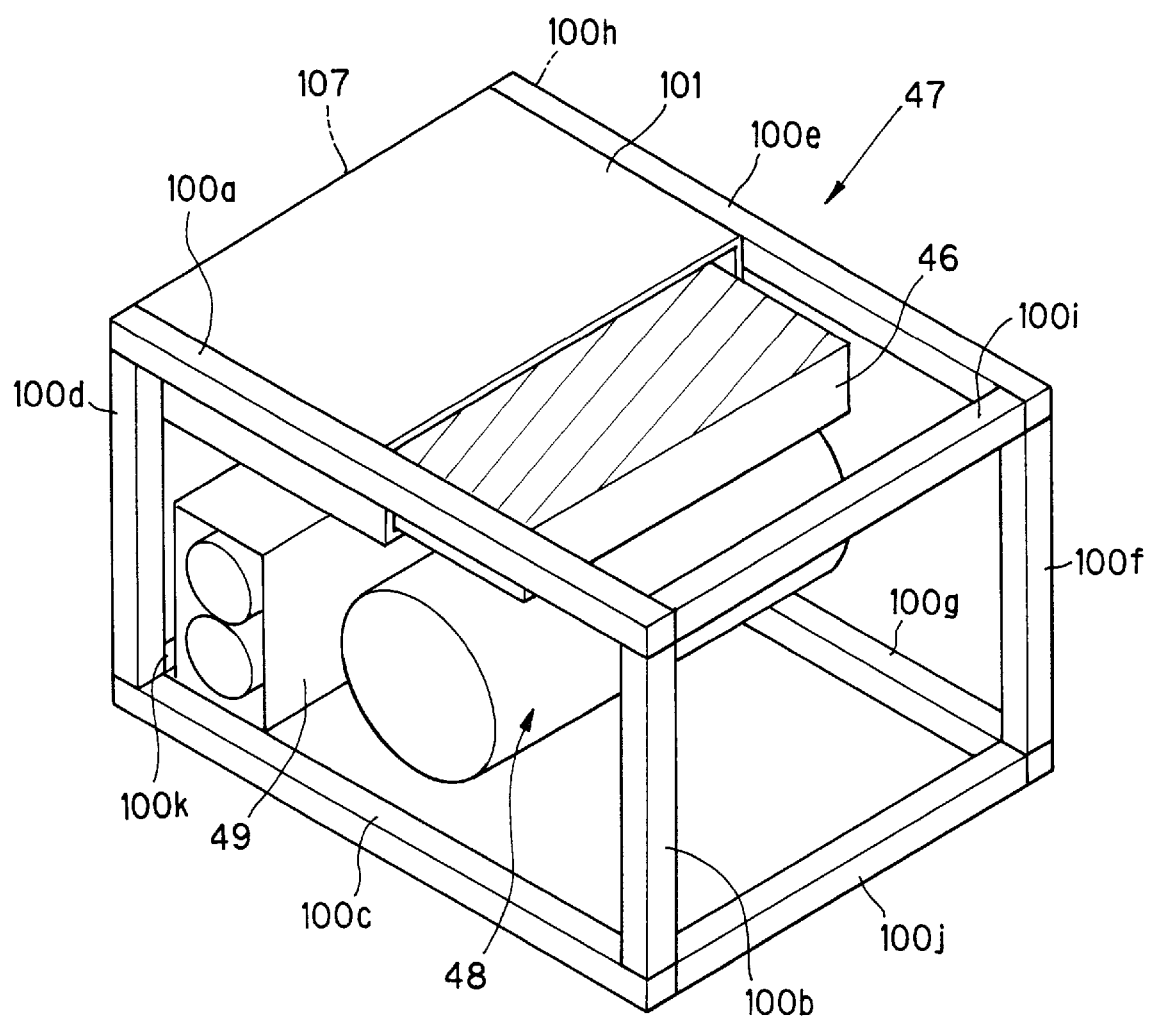
FIG. 2 is an external view showing a configuration of an image recording portion of a digital copier to which a cooling system according to the first embodiment of the present invention is applied.
Figure 3:
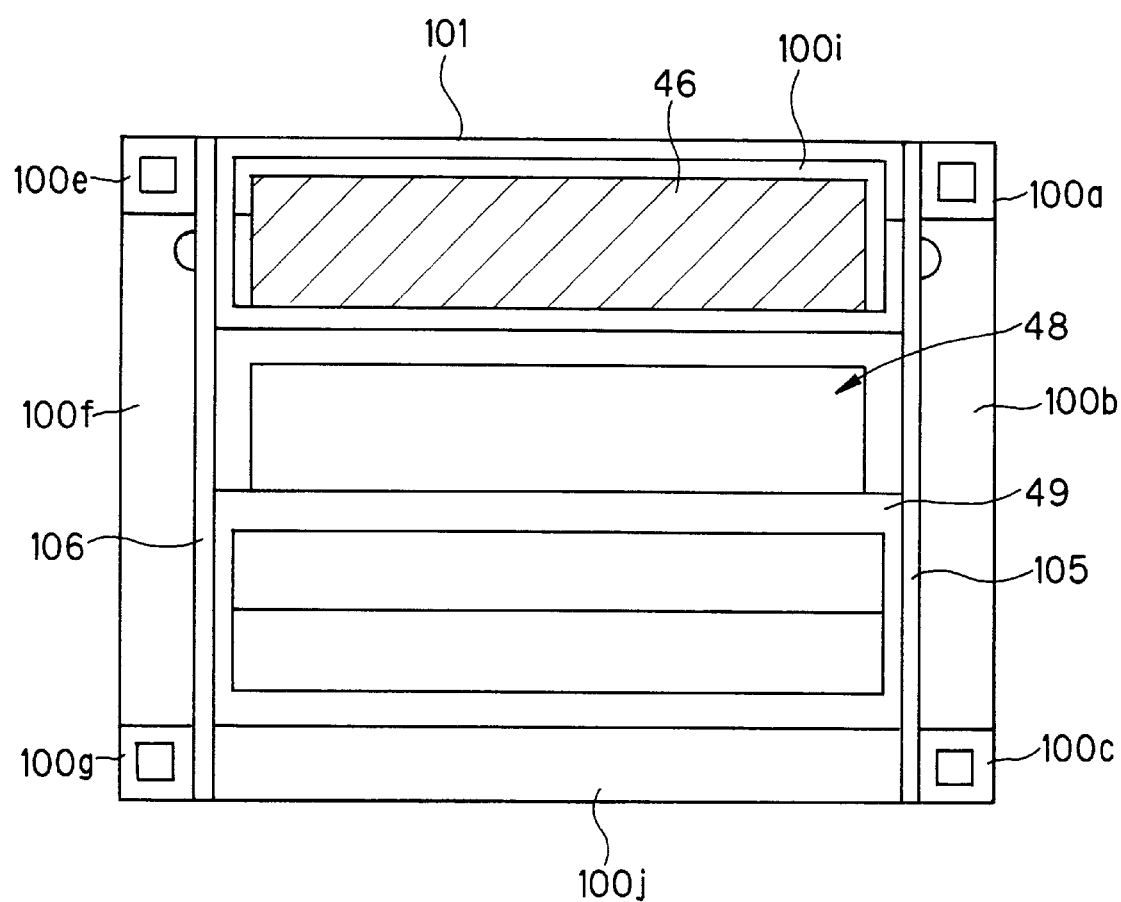
FIG. 3 is a left-side sectional view showing the same image recording portion as above.

FIG. 2 is an external view showing a configuration of an image recording portion of a digital copier to which a cooling system according to the first embodiment of the present invention is applied. FIG. 3 is a left-side sectional view showing the same image recording portion. Image recording portion 47 of digital copier 30 to which the cooling system according to the first embodiment is applied has a frame composed of a square pipes 100a to 100k and a duct 101. Square pipes 100a to 100d form a front frame located on the front side of digital copier 30 while square pipes 100e to 100h form a rear frame located on the rear side of digital copier 30. Square pipes 100i to 100k and air duct 101 are provided so as to organize the front frame (square pipes 100a to 100d) and the rear frame (square pipes 100e to 100h) in parallel to each other at a predetermined distance, while front and rear metal sheets 105 and 106 are held between these spacing elements, and the front frame, and the rear frames, respectively. Duct 101 is located together with square pipes 100i and 100k, between square pipe 100a and square pipe 100e and between square pipe 100d and square pipe 100h to reinforce the entire frame configuration.

Laser writing unit 46, process unit 48 and fixing unit 49 are fixed to front and rear metal sheets 105 and 106, with screws so that they are arranged and assume their predetermined positional relationship in the above frame. As described above, in image recording portion 47, the motor in laser writing unit 46 and fixing unit 49 are the heat sources while laser writing unit 46 including the motor is the target to be cooled. Fixing unit 49 is the high-temperature unit which needs to be maintained at the predetermined temperature that allows the developer image transferred on the paper to fuse. Therefore, it is necessary to suppress the temperature rise of laser writing unit 46 due to heat arising from the motor in laser writing unit 46 and from fixing unit 49 and still prevent excessive removal of heat from fixing unit 49.

For this purpose, part of laser writing unit 46 is accommodated inside duct 101 configured of a high thermally conductive material with provision of a fan 107 forming an air flow inside duct 101. This configuration enables heat arising from the motor inside laser writing unit 46 to be discharged out of duct 101 together with the air flow created by fan 107, thus preventing temperature rise of laser writing unit 46 due to heat arising from the motor in laser writing unit 46. Further, since laser writing unit 46 does not directly oppose fixing unit 49, heat from fixing unit 49 will not cause a temperature rise of laser writing unit 46. Moreover, the air flow will not come in direct contact with fixing unit 49, so that no reduction in temperature of fixing unit 49 due to discharge of air to the outside will occur.

Therefore, it is possible to positively prevent temperature rise of laser writing unit 46, which is the target to be cooled. Hence, the laser beam spot irradiated from laser writing unit 46 on the photoreceptor drum surface will not deviate from its correct position, enabling formation of a highly reproducible copy image. Further, it is also possible to maintain the predetermined high-temperature state of fixing unit 49, thus making it possible to reliably fuse the developer image transferred to the paper and fix it to the paper surface.

Figure 4:
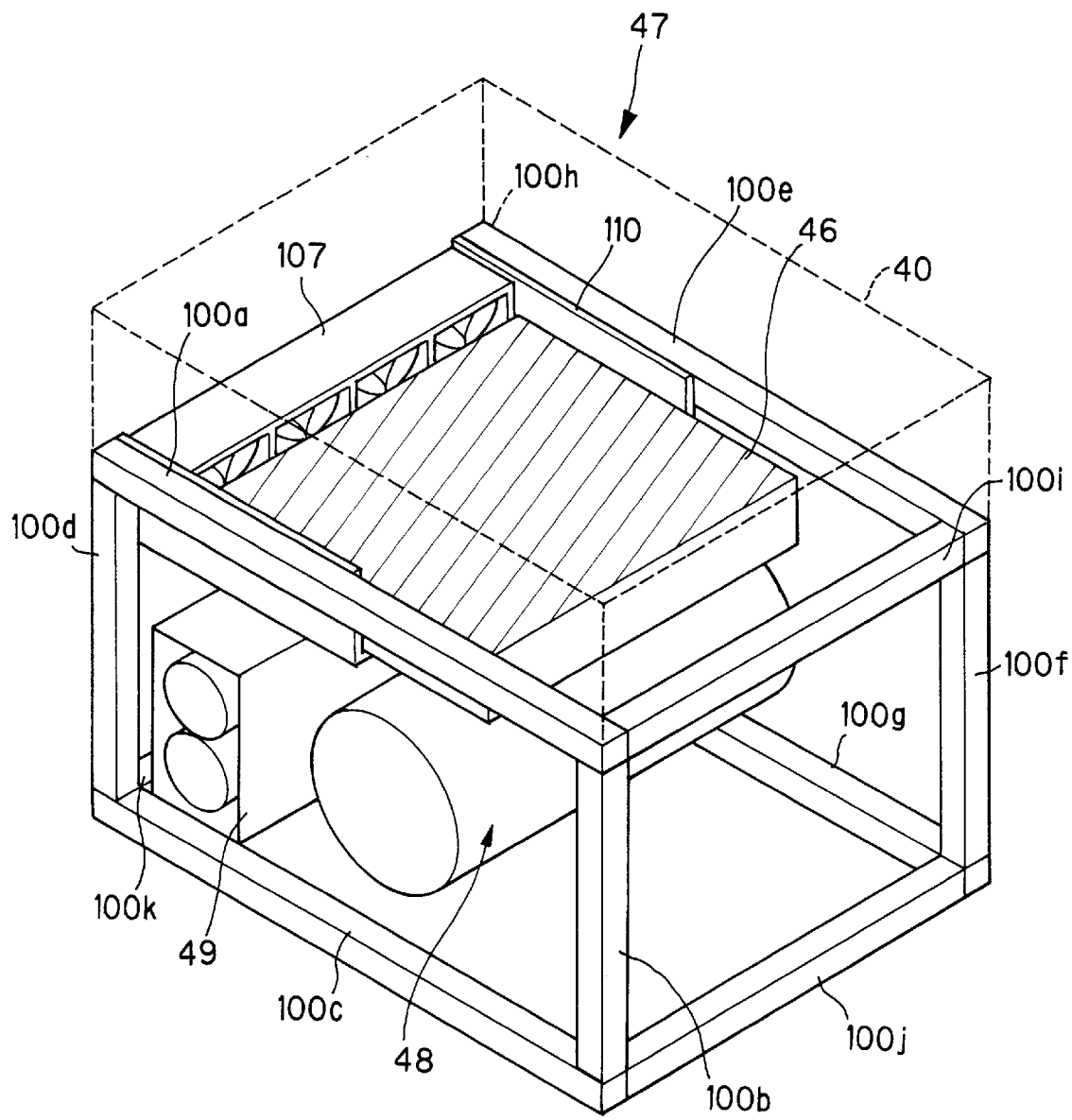
FIG. 4 is an external view showing a configuration of an image recording portion of a digital copier to which a cooling system according to the second embodiment of the present invention is applied.
Figure 5:
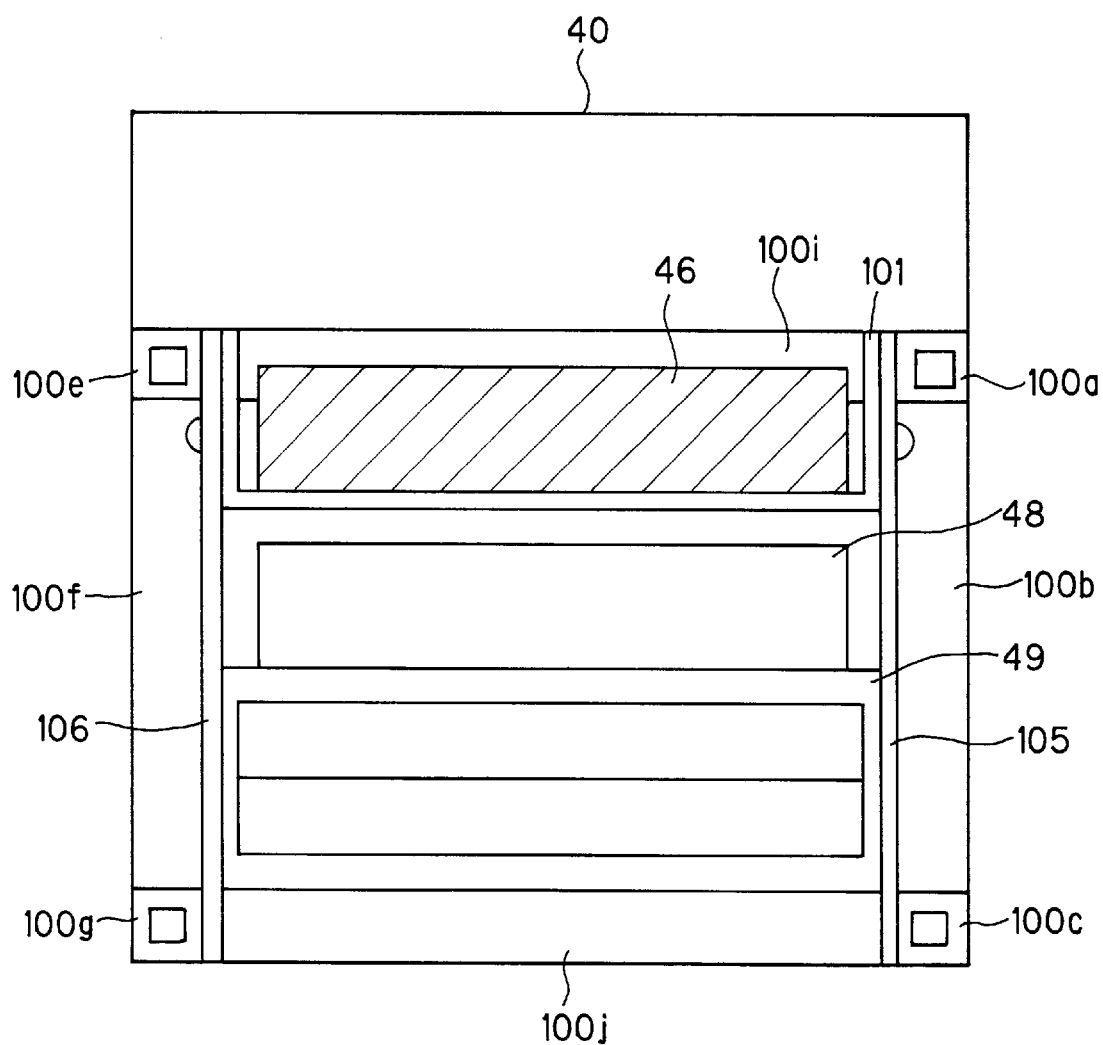
FIG. 5 is a left-side sectional view showing the same image recording portion as above.

FIG. 4 is an external view showing a configuration of an image recording portion of a digital copier to which a cooling system according to the second embodiment of the present invention is applied. FIG. 5 is a left-side sectional view of the same image recording portion. An image recording portion 47 of a digital copier 30 to which the cooling system according to the second embodiment is applied, includes a cover 110 having a U-shaped section opening at the top, in place of duct 101 shown in FIGS. 2 and 3. Cover 110 is formed of a high thermally conductive material similar to duct 101 in the first embodiment and organizes the front frame (square pipes 100a to 100d) and the rear frame (100e to 100h) spaced by the predetermined distance and also functions to reinforce the entire frame configuration.

Further, when a scanner unit 40 may be arranged at top of image recording portion 47, the top side of cover 110 is covered by the bottom surface of scanner unit 40 so as to define an air flow passage between the bottom surface of scanner unit 40 and the interior surface of cover 110. Cover 110 accommodates laser writing unit 46 and a fan 107 therein. Driving of fan 107 creates an air flow in the air flow passage defined between the bottom surface of scanner unit 40 and the interior surface of cover 110.

Similarly to the first embodiment, the configuration of the second embodiment enables heat arising from the motor inside laser writing unit 46 to be discharged out of cover 110 together with the air flow created by fan 107, thus preventing temperature rise of laser writing unit 46 due to heat arising from the motor in laser writing unit 46. Further, since laser writing unit 46 does not directly oppose fixing unit 49, heat from fixing unit 49 will not cause temperature rise of laser writing unit 46. Moreover, no air flow will come in direct contact with fixing unit 49, so that no reduction in temperature of fixing unit 49 due to discharge of air to the outside will occur.

Therefore, it is possible to positively prevent temperature rise of laser writing unit 46. Hence, the laser beam spot irradiated from laser writing unit 46 on the photoreceptor drum surface will not deviate from its correct position, enabling formation of a highly reproducible copy image. Further, it is also possible to maintain the predetermined high-temperature state of fixing unit 49, thus making it possible to reliably fuse the developer image transferred to the paper and fix it on the paper surface.

Duct 101 in the first embodiment and cover 110 in the second embodiment can be formed by die-casting of aluminum alloy or injection molding of magnesium alloy. Die-casted articles of aluminum alloy not only present a high thermal conductivity but also are light and have less distortion. Injection molded articles of magnesium alloy are high in strength and can be formed with high precision without the necessity of post-machining after molding.

Therefore, the formation of duct 101 and cover 110 by die-casting of aluminum alloy or injection molding of magnesium alloy enables sufficient cooling of the laser emitting portion inside laser writing unit 46 and provides a high dimensional precision of the frame constituting image recording portion 47 whilst securing high enough strength for the entire configuration of digital copier 30.

Further, since laser writing unit 46 is supported by duct 101 or cover 110 which is of an aluminum alloy die-casting or of a magnesium alloy injection molding, it is possible to prevent variation of the mounted position of laser writing unit 46 and hence maintain good conditions for the reproduction of copy images.

Moreover, among square pipes 100a to 100k, etc., constituting the frame, part of the members close to the heat sources such as fixing unit 49, or all the members may be formed of a high thermally conductive material so as to prevent temperature rise of image recording portion 47 whilst preventing reduction in the strength of the frame, which is attributed to distortion due to thermal stress. Also in this case, part or all of square pipes 100a to 100k, etc. may be formed of aluminum alloy die-casting or magnesium alloy injection molding, so as to realize a more rigid frame configuration.

Figure 6:
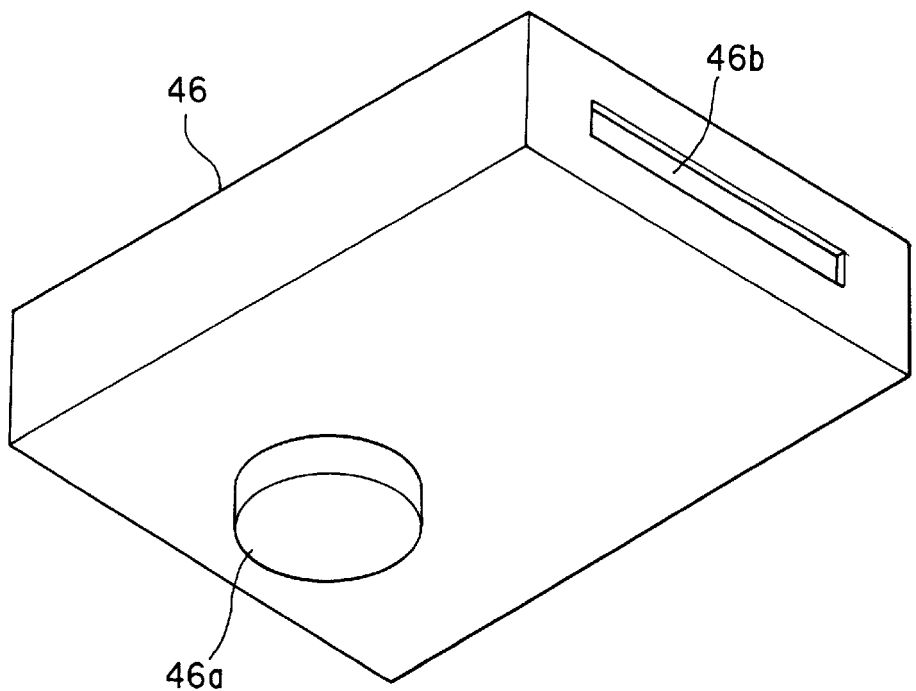
FIG. 6 is a perspective view from the bottom side showing a laser writing unit of a digital copier to which the cooling systems according to the first and second embodiments are applied.
Figure 7:
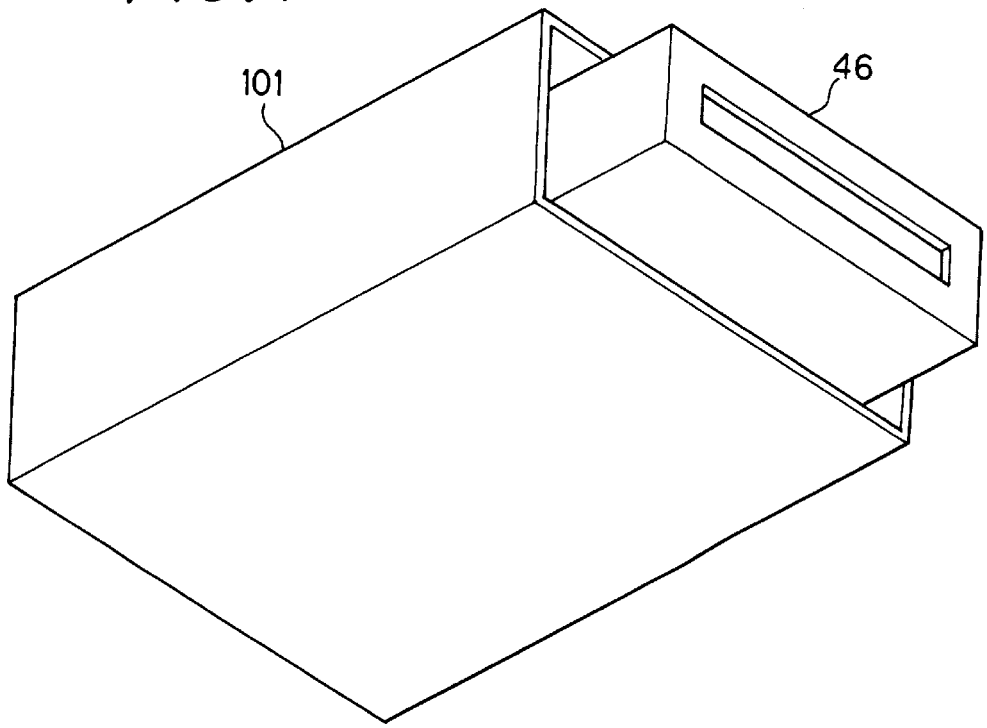
FIG. 7 is a perspective view from the bottom side showing a laser writing unit accommodated in a duct.

FIG. 6 is a perspective view from the bottom side showing a laser writing unit of a digital copier to which the cooling systems according to the first and second embodiments are applied. In laser writing unit 46, a motor 46a, which has a high a mount of heat emission, for rotating the polygon mirror at a high speed is exposed from the bottom surface of laser writing unit 46. When laser writing unit 46 having this configuration is accommodated in duct 101 of the cooling system according to the first embodiment, for example, as shown in FIG. 7, motor 46a is directly exposed to the air flow created inside duct 101 by the aforementioned fan 107, so that heat arising from motor 46a can efficiently be discharged out of duct 101 together with the air flow.

Figure 8:
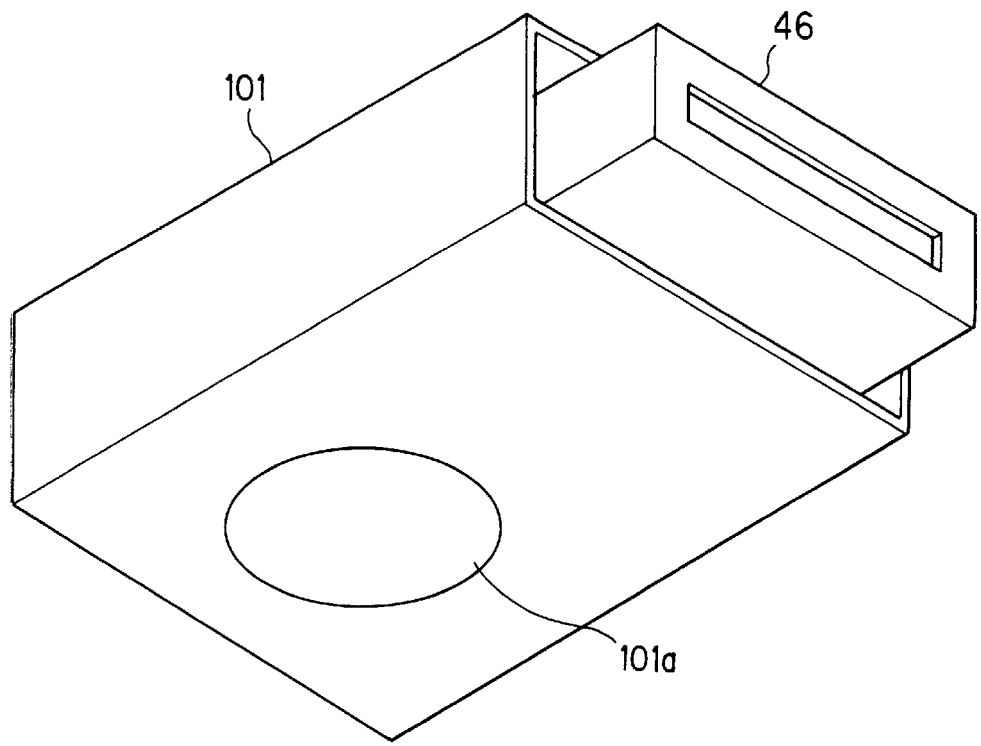
FIG. 8 is a perspective view from the bottom side showing another example of a duct of the cooling systems according to the first and second embodiments.
Figure 9:
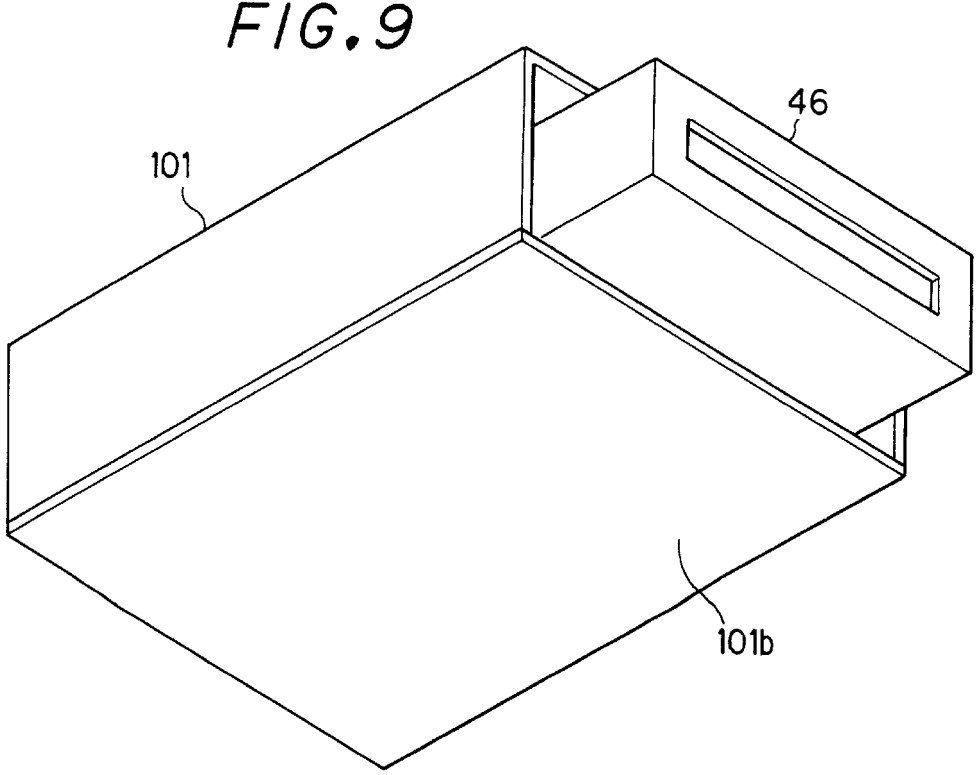
FIG. 9 is a perspective view from the bottom side showing a further example of a duct of the cooling systems according to the first and second embodiments.

In this case, as shown in FIGS. 8 and 9, in duct 101, only part (101a) or the whole of bottom surface 101b opposing the exposed motor 46a from the bottom of laser writing unit 46 may be configured of a high thermally conductive material, so as to efficiently dissipate heat arising from motor 46a outside duct 101, thus making it possible to prevent temperature rise of laser writing unit 46.

Figure 10:
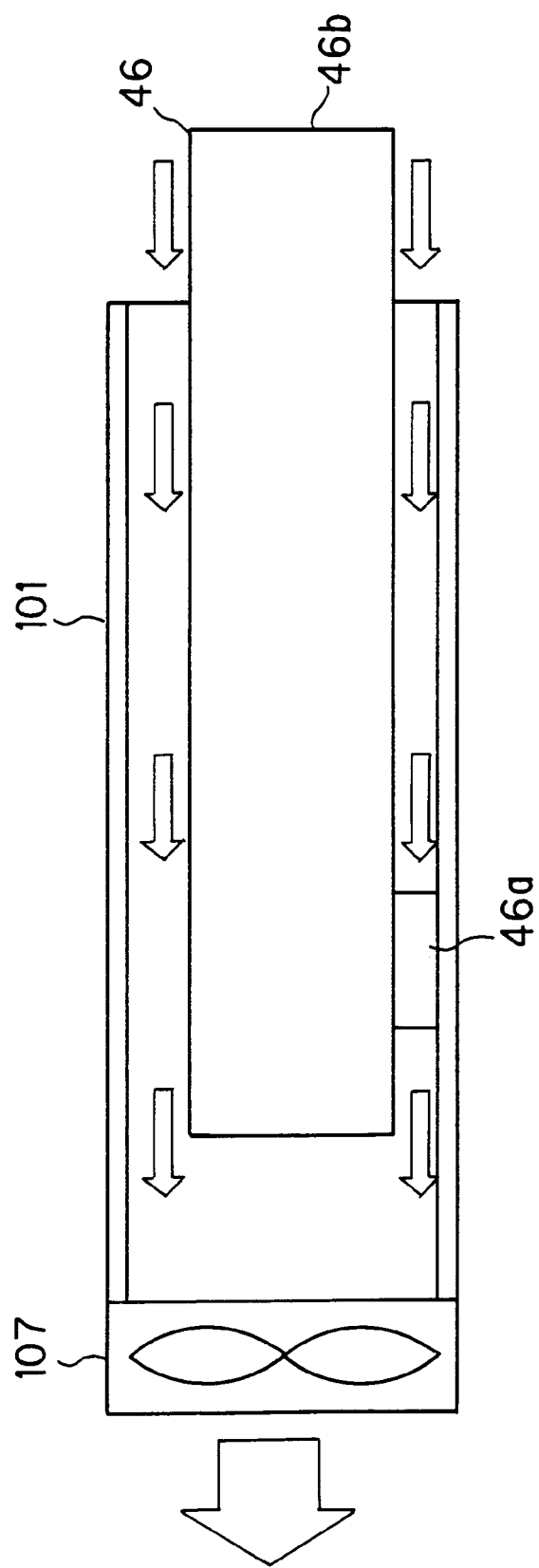
FIG. 10 is a view showing the air flow passage in the duct of the cooling systems according to the first and second embodiments.

Further, as shown in FIG. 10, placing the bottom surface of motor 46a into contact with the inner surface of duct 101 provides a further enhanced discharge of heat arising from motor 46a out of duct 101. When, at least, an aperture 46b, in laser writing unit 46, which the laser beam passes through is arranged outside duct 101 so that aperture 46b will not be located within the air flow created inside duct 101, it is possible to prevent entrance of dust and dirt into laser writing unit 46 through aperture 46b as well as preventing adhesion of dust and dirt onto the glass surface disposed at aperture 46b.

It should be noted that the configuration of duct 101 shown in FIGS. 7 to 10 can be applied similarly to cover 110.

Figure 11:
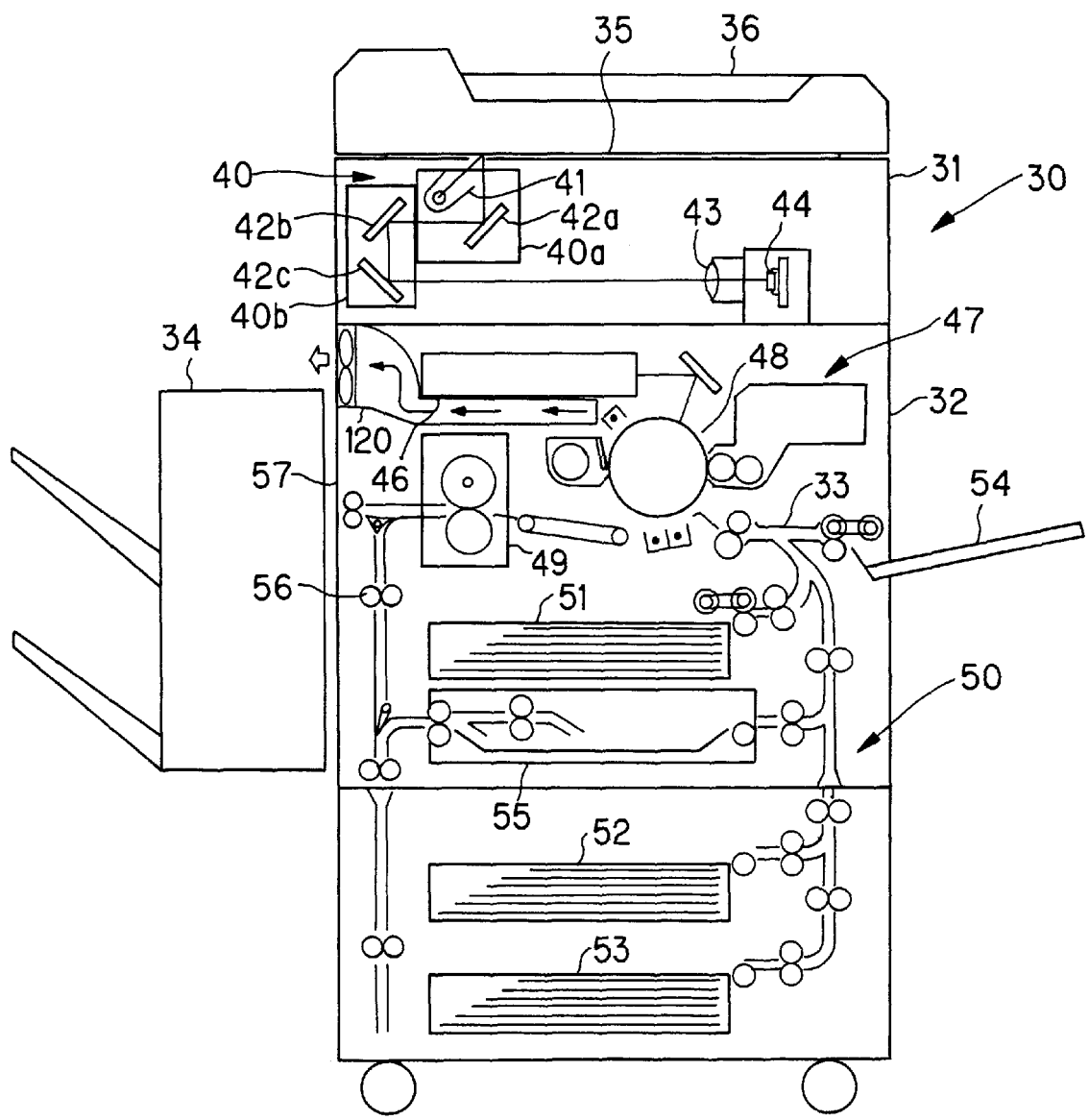
FIG. 11 is a schematic front sectional view showing a configuration of a digital copier to which a cooling system according to the third embodiment of the present invention is applied.

FIG. 11 is a schematic front sectional view showing a configuration of a digital copier to which a cooling system according to the third embodiment of the present invention is applied. A digital copier 30a with the cooling system according to the embodiment has the same configuration as digital copier 30 shown in FIG. 1, except in that a duct 120 is disposed between laser writing unit 46 and fixing unit 49, in place of duct 101 accommodating part of laser writing unit 46 in the configuration of digital copier 30. This duct 120, partly or as a whole, is configured of a high thermally conductive material, similar to duct 101 and cover 110 while a fan 107 is provided inside duct 120 to create an air flow.

This configuration permits duct 120 to separate fixing unit 49 as a heat source and laser writing unit 46 as a target to be cooled so that heat arising from fixing unit 49 will not directly transmit to laser writing unit 46, thus realizing a more reliable prevention of temperature rise of laser writing unit 46.

Figure 12:
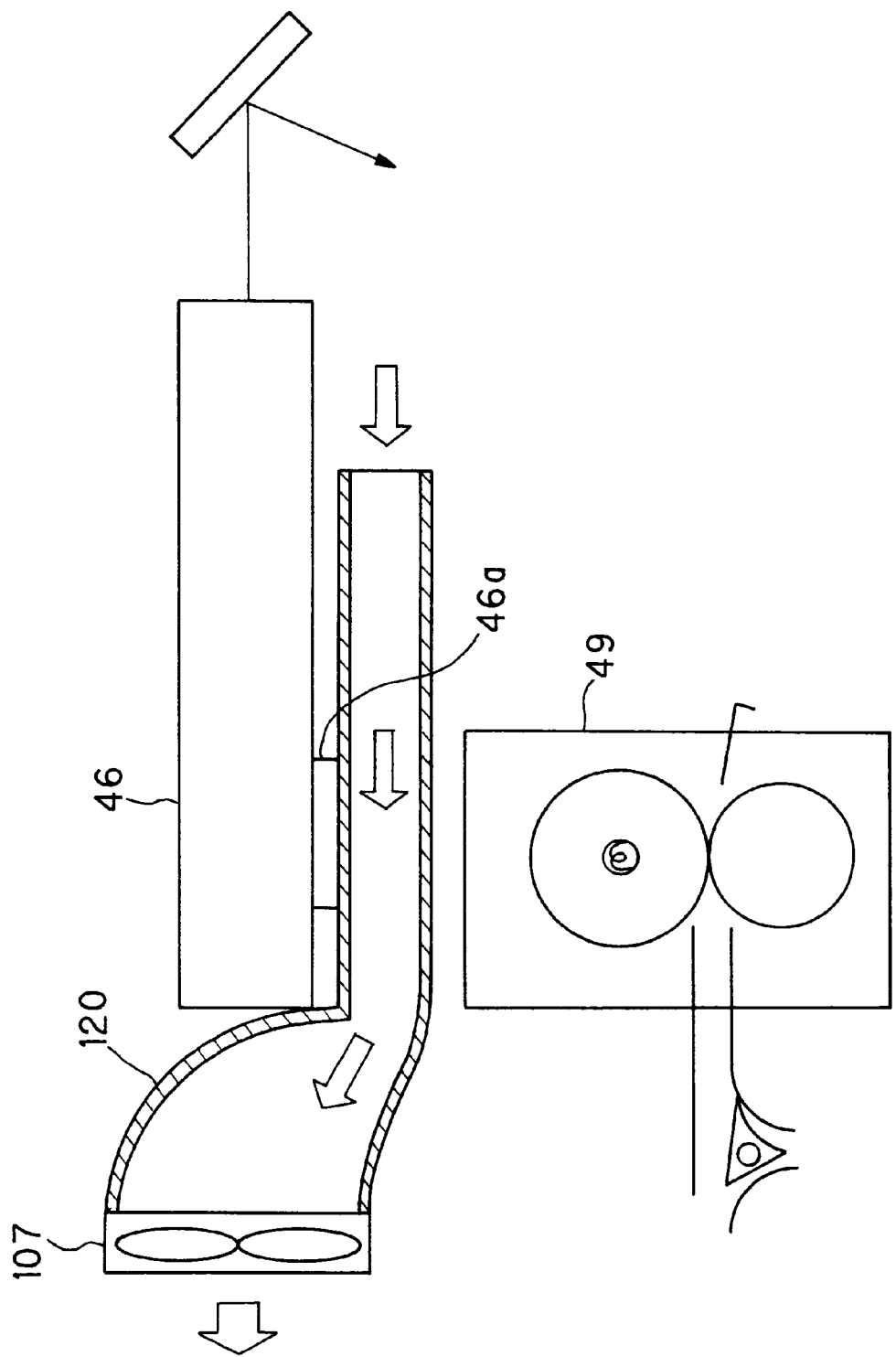
FIG. 12 is a front sectional view showing the layout of essential parts of the cooling system in accordance with the third embodiment.
Figure 13:
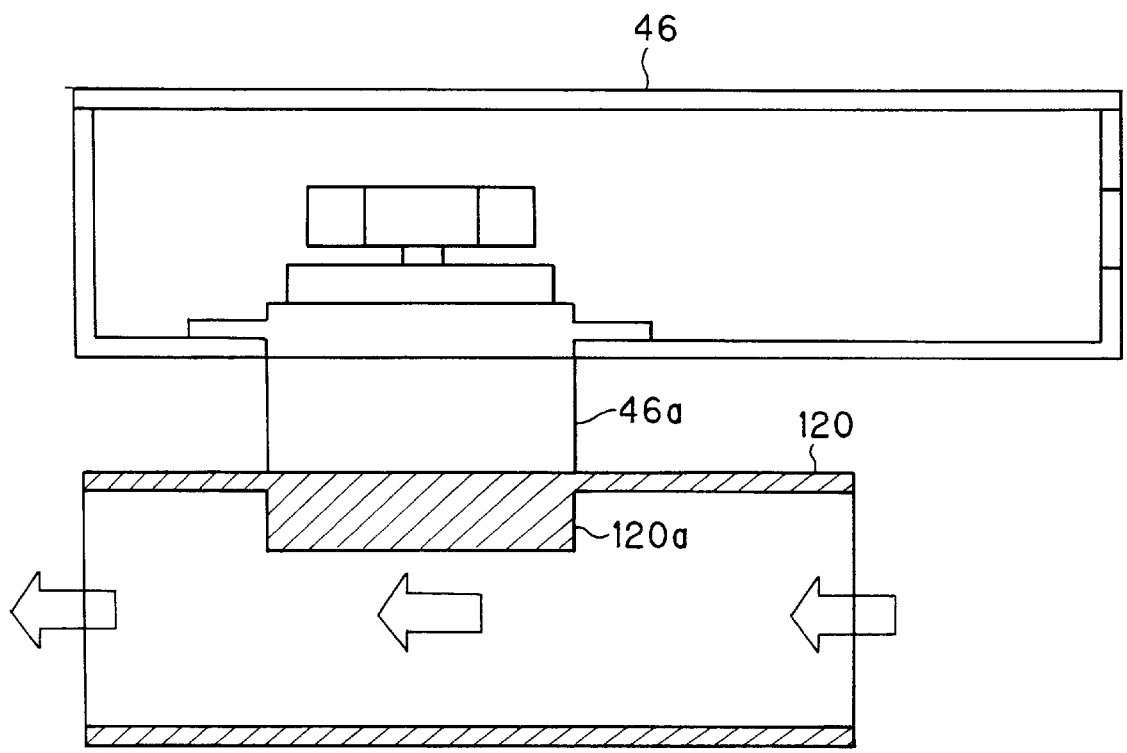
FIG. 13 is a view showing the layout of a laser writing unit and a duct in the cooling system according to the third embodiment.

In this configuration, when motor 46a is exposed from the bottom surface of laser writing unit 46 (see FIG. 6), motor 46a exposed from the bottom surface of laser writing unit 46 can be placed into contact with, or in proximity to, the top surface of duct 120, as shown in FIG. 12. This enables efficient heat dissipation of heat arising from motor 46a as a heat source by way of the top surface of duct 120 whilst preventing temperature rise of the laser writing portion in laser writing unit 46 as a target to be cooled. In this case, as shown in FIG. 13, radiation fins 120a exposed to the air flow inside duct 120 may be protectively formed on the inner top surface of duct 120 corresponding, at least, to the position of motor 46a on the opposite side, so that the heat discharge efficiency of the air flow in duct 120 with respect to heat arising from motor 46a can be enhanced.

Figure 14:
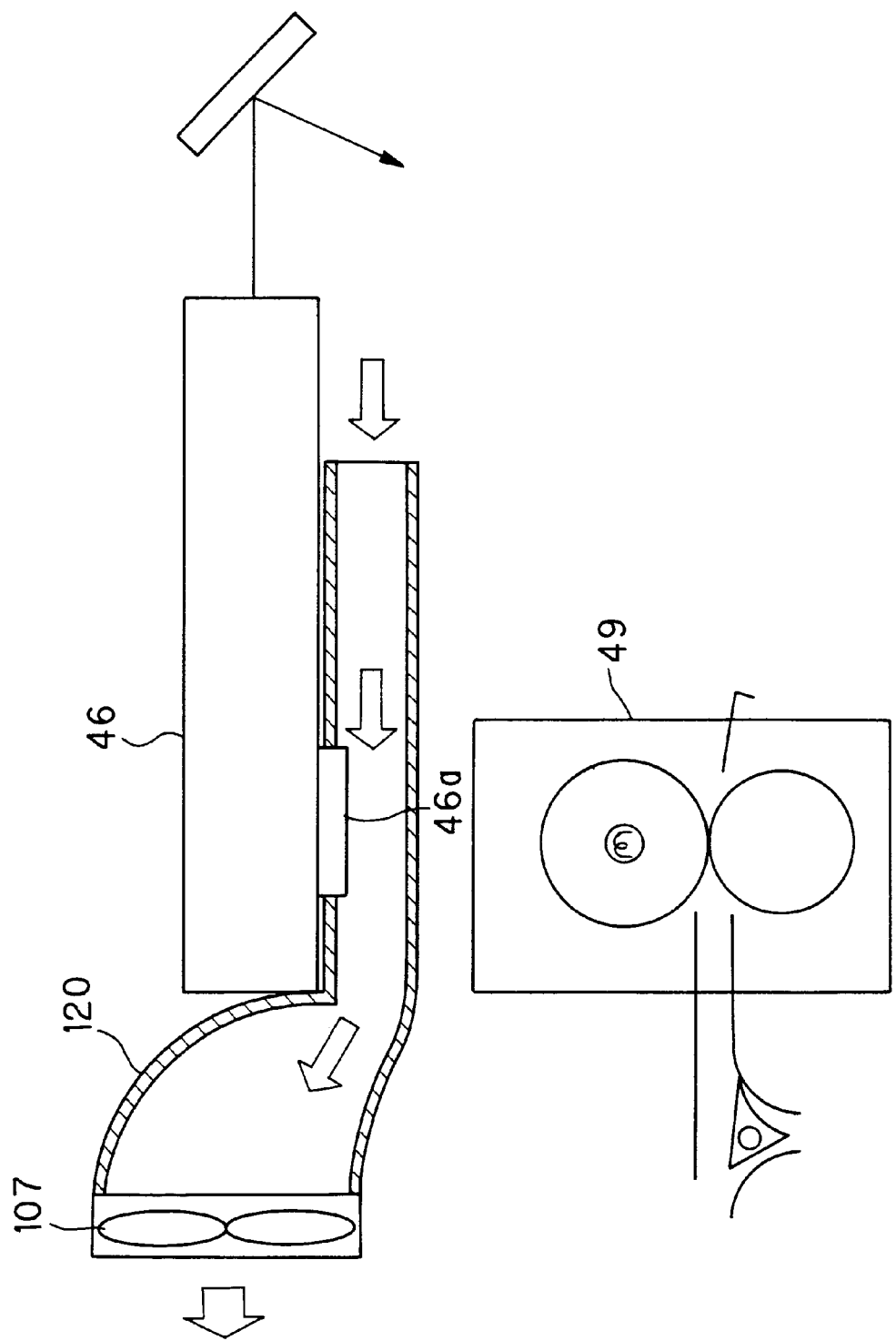
FIG. 14 is a front sectional view showing another layout of a cooling system according to the third embodiment.

As shown in FIG. 14, motor 46a exposed from the bottom surface of laser writing unit 46 can be exposed to the inner space of duct 120. This configuration permits motor 46a as a heat source to be directly exposed to the air flow created inside duct 120, so that it is possible to discharge the heat arising from motor 46a, at an increased efficiency.

Figure 15:
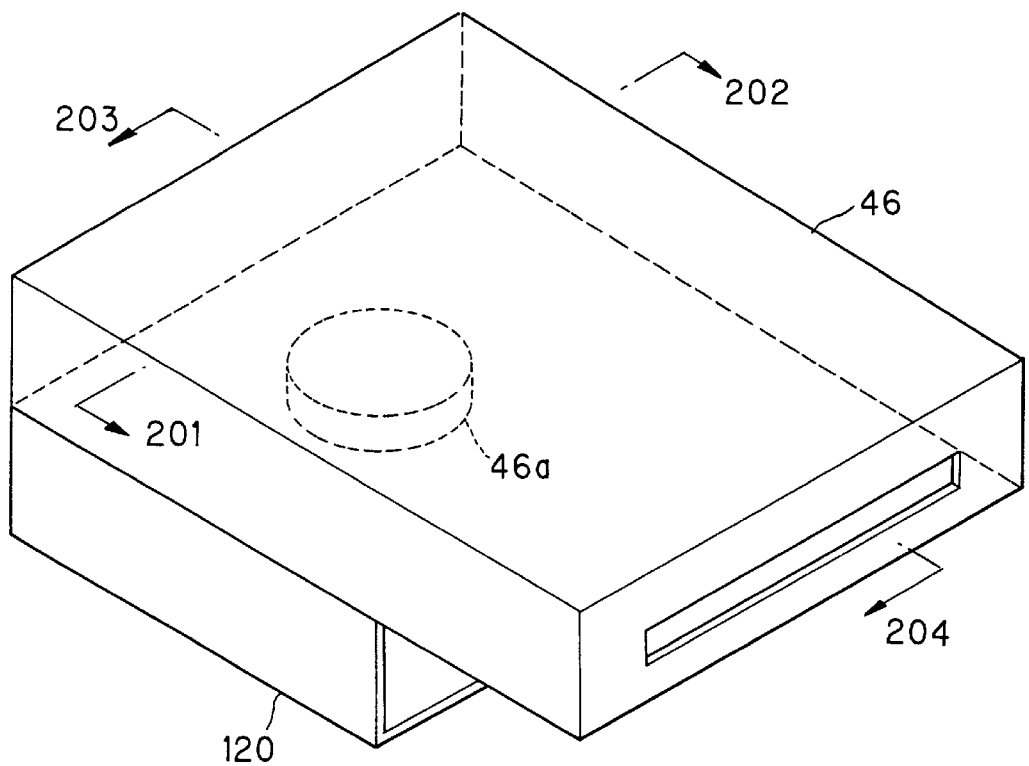
FIG. 15 is an external view showing still another layout of a cooling system according to the third embodiment.
Figure 16:
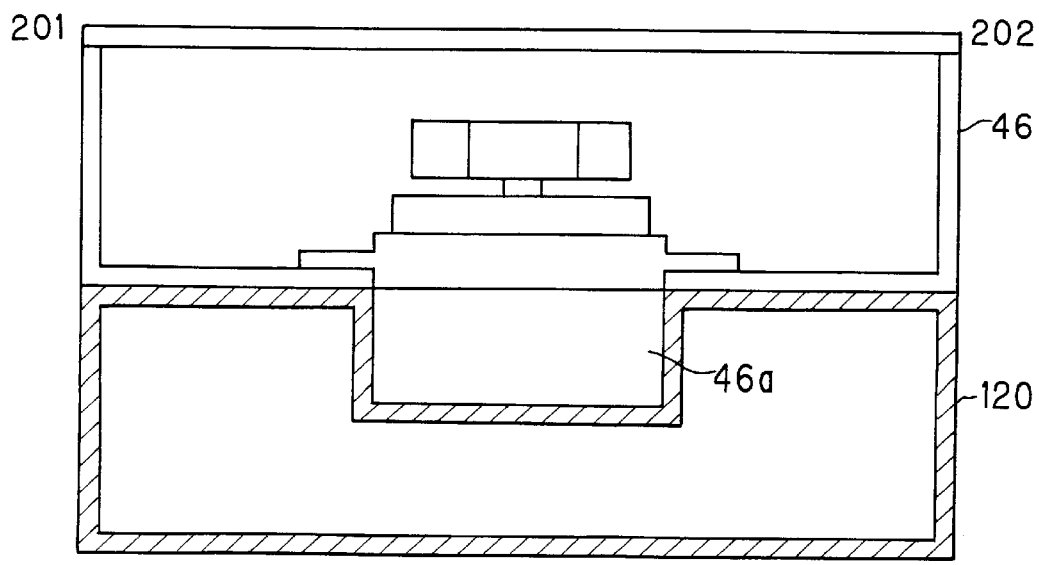
FIG. 16 is a sectional side view showing the same layout as above.
Figure 17:
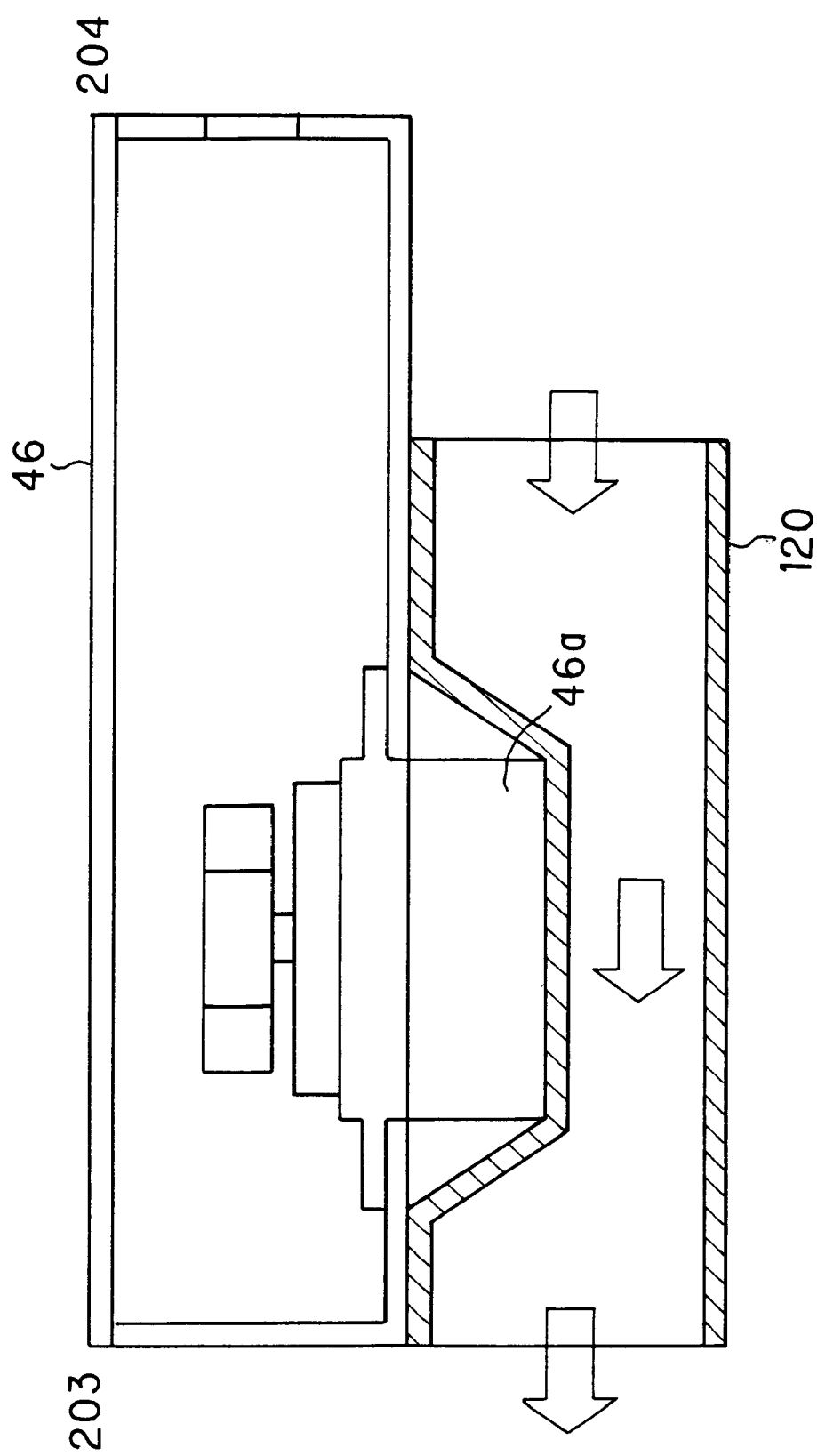
FIG. 17 is a front sectional view showing the same layout as above.

Further, as shown in FIGS. 15 to 17, part of the top side of duct 120 may be formed so as to enclose the periphery of motor 46a that is exposed from the bottom surface of laser writing unit 46. In this case, not only the bottom surface of motor 46a but also its peripheral side may be placed in contact with, or in proximity to, the top side of duct 120, so as to discharge heat arising from motor 46a as a heat source at an increased efficiency by way of duct 120. In this configuration, among the surfaces which make up an inwardly projected portion from the ceiling of duct 120, at least, the surface opposing the upstream side in the air flow passage, can be formed of an inclined surface so as to secure smooth air flow inside duct 120.

For fan 107 that creates air flow in duct 120, a scirocco fan that keeps the flow of air in the air flow passage constant may be used. This can effectively prevent reduction in heat dissipation efficiency due to reduction of the flow of air or reduction of the cross section of the air flow passage attributed to the partial projection from the ceiling of duct 120. Here, FIG. 16 is a sectional view taken along a plane 201–202 in FIG. 15 and FIG. 17 is a sectional view taken along a plane 203–204 in FIG. 15.

Figure 18:
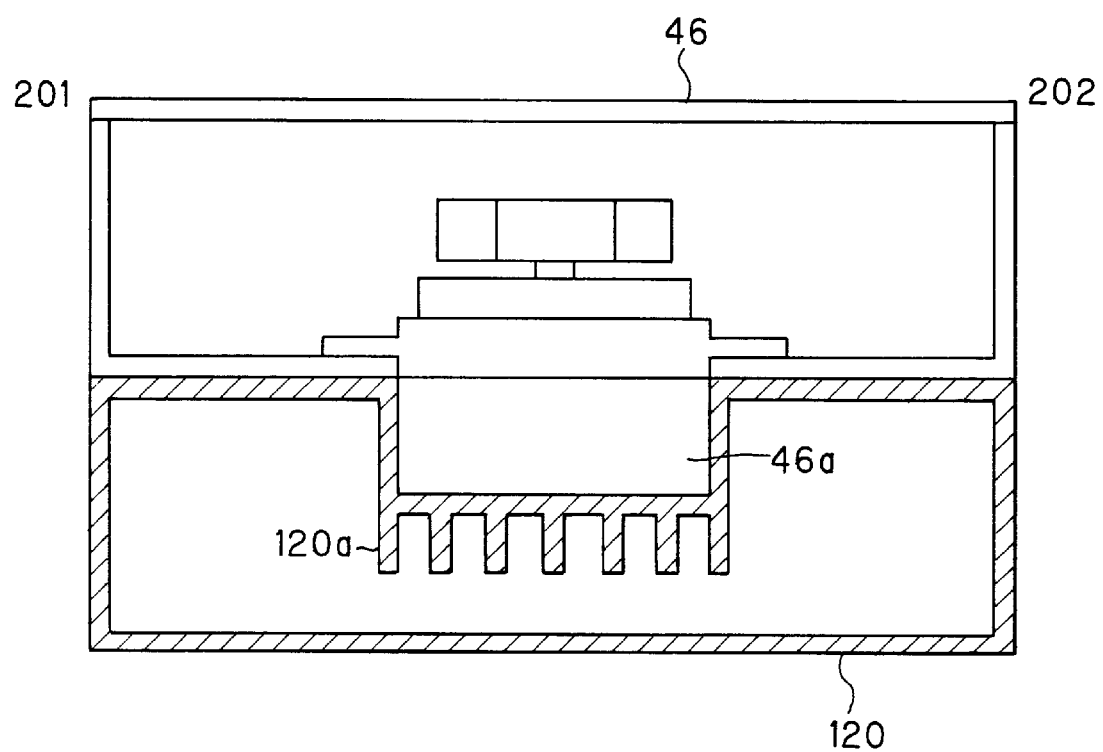
FIG. 18 is a sectional side view showing another duct configuration for a cooling system according to the third embodiment.
Figure 19:
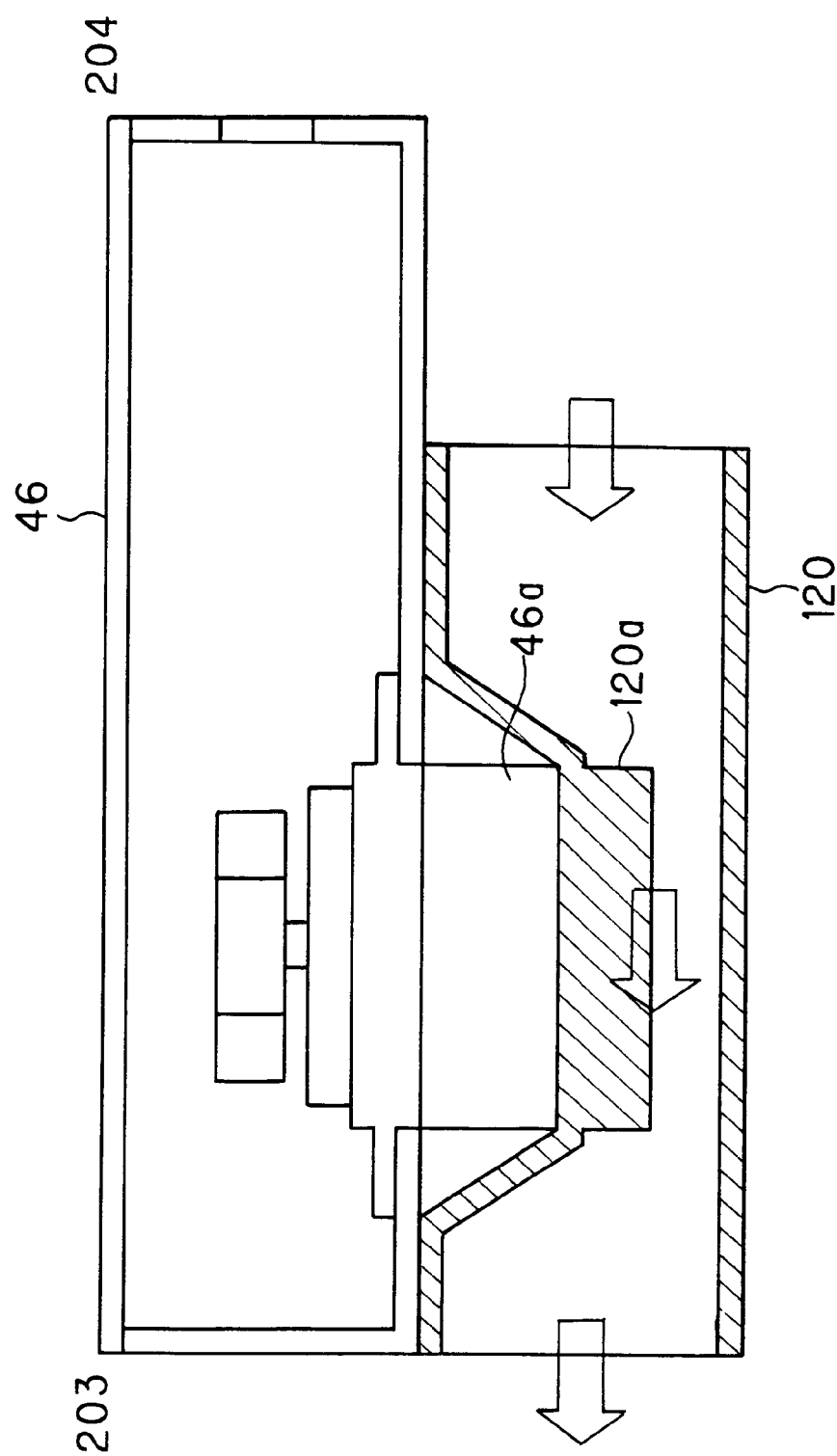
FIG. 19 is a front sectional view showing the same duct configuration.

In this case, as shown in FIGS. 18 and 19, radiation fins 120a exposed to the air flow inside duct 120 may be projectively formed on the upper interior surface of duct 120 corresponding, at least, to the position of motor 46a on the opposite side, so that the heat dissipation efficiency of the air flow in duct 120 with respect to heat arising from motor 46a can be enhanced. Here, FIG. 18 is a sectional view taken along a plane 201–202 in FIG. 15 and FIG. 19 is a sectional view taken along a plane 203–204 in FIG. 15.

Figure 20:
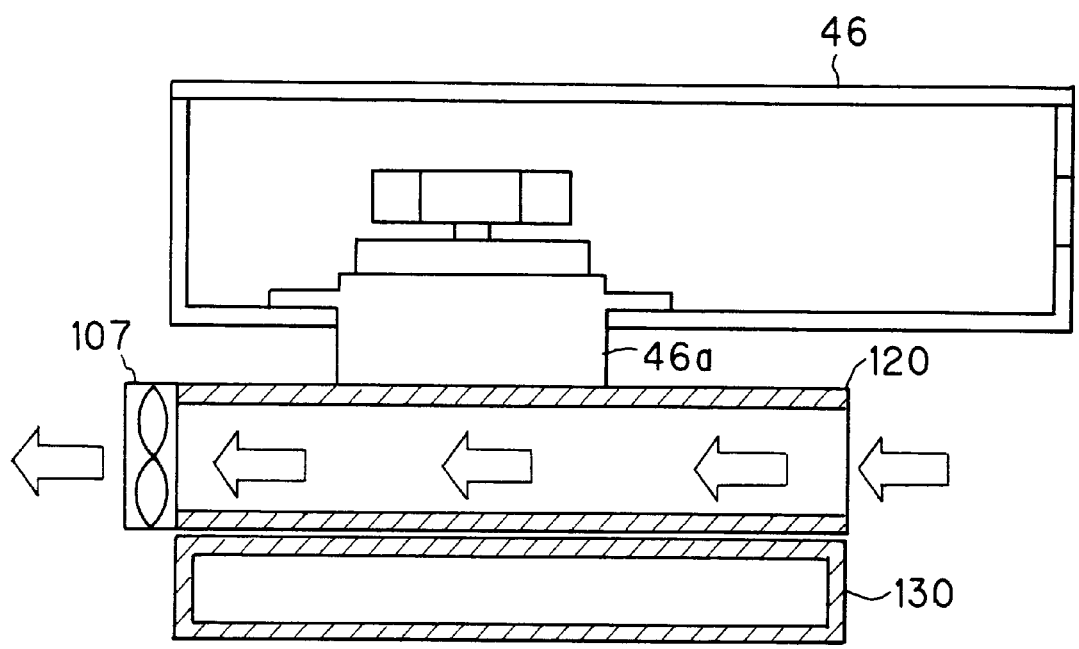
FIG. 20 is a sectional view showing a configuration of a cooling system in accordance with the fourth embodiment of the present invention.
Figure 20:
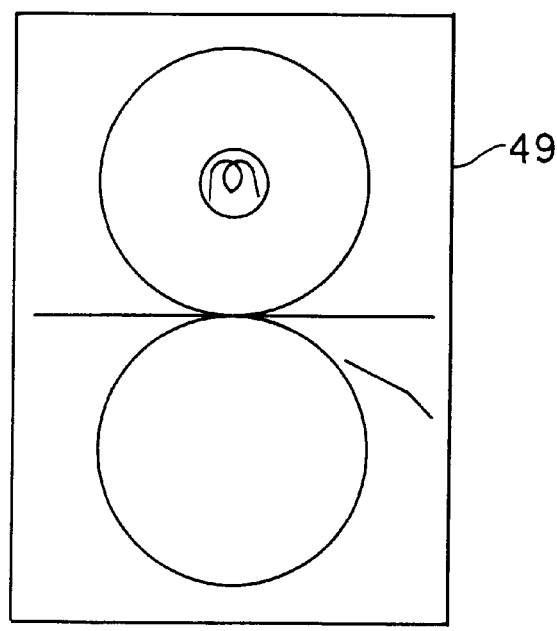

FIG. 20 is a sectional view showing a configuration of a cooling system in accordance with the fourth embodiment of the present invention. The cooling system according to this embodiment has almost the same configuration as the cooling system according to the above third embodiment in which duct 120 is disposed between laser writing unit 46 and fixing unit 49, except in that a heat reserving member 130 is arranged between duct 120 and fixing unit 46. This heat reserving member 130 is a hollow body, made up of, for example, a foamed resin having a low thermal conductivity, with air layer or vacuum layer in the central hollow space. The whole or part of heat reserving member 130 can be configured of a heat insulation material.

This configuration enables duct 120 to efficiently prevent temperature rise of laser writing unit 46 as a target to be cooled while preventing duct 120 with an air flow passage therein, made up partly or as a whole of a high thermally conductive material from removing heat from fixing unit 49, which is a heat source and a unit to be heat insulated or maintained at the predetermined high-temperature state in order to fuse the developer image onto the paper.

Figure 21:
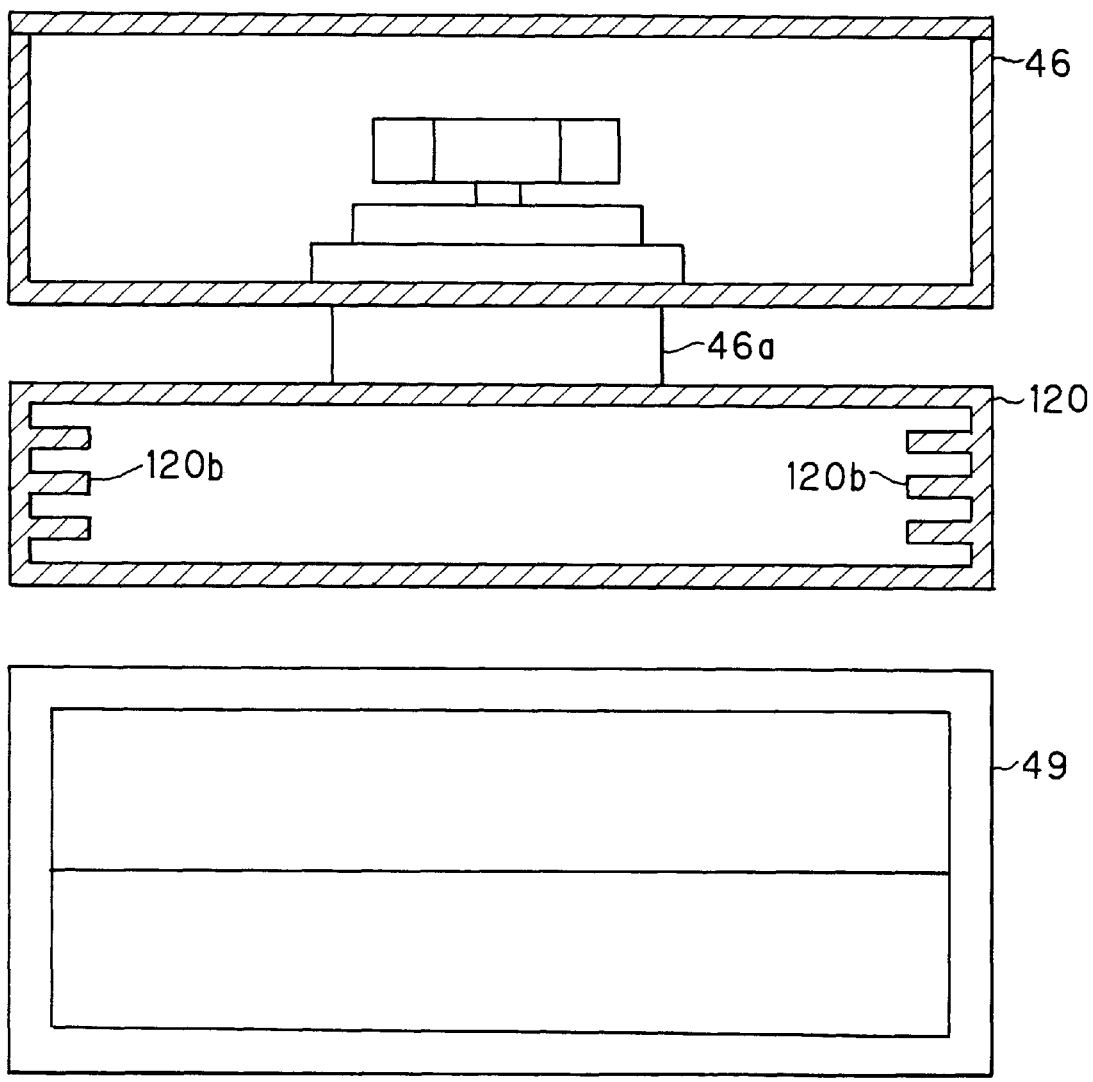
FIG. 21 is a sectional view showing a configuration of a cooling system in accordance with the fifth embodiment of the present invention.

FIG. 21 is a sectional view showing a configuration of a cooling system in accordance with the fifth embodiment of the present invention. The cooling system according to this embodiment has radiation fins 120b exposed to the air flow passage and formed on the vertical interior surfaces of duct 120 that is arranged between laser writing unit 46 and fixing unit 49. By this configuration, heat from the bottom surface of duct 120 opposing fixing unit 49 or the heat source can be efficiently released to the air flow passage via radiation fins 120b so that heat generated from fixing unit 49 will not transmit to laser writing unit 46 or the target to be cooled, via duct 120 and hence the temperature rise of laser writing unit 46 can be prevented.

The above effect can be also attained by forming the bottom of duct 120 opposing fixing unit 49, the heat source and the high-temperature unit, using a low thermally conductive material and forming the ceiling of duct 120 opposing laser writing unit 46, the target to be cooled, using a high thermally conductive material.

The above first through fifth embodiments have been described through a digital copier as an electronic appliance to which the cooling systems of the present invention is applied. However, the present invention can also be applied to any other electronic appliance including a high-temperature unit and a low-temperature unit.

According to the above first feature of the present invention, the high-temperature unit to be maintained in a predetermined high temperature state and the low-temperature unit to be kept from temperature rise can be separated by the whole or part of the duct having an air flow passage for exhaust only created therein. Therefore, heat arising on the low-temperature unit side from the high-temperature unit can be absorbed by the air passing through the air flow passage inside the duct and discharged therethrough, thus preventing conduction of heat to the low-temperature unit and hence temperature rise in the low-temperature unit. Further, since the high-temperature unit is arranged so as not to be in direct contact with the exhaust air, no heat will be removed from the high-temperature unit through the exhaust air, thus making it possible to prevent the high-temperature unit from being reduced in temperature.

According to the above second feature of the present invention, at least the heat source of the low-temperature unit is placed into contact with the exhaust air passing through the air flow passage created inside the duct. Therefore, heat arising from a heat source in the low-temperature unit can be absorbed by the exhaust air and discharged thereby, thus making it possible to prevent temperature rise in the low-temperature unit.

According to the above third feature of the present invention, heat arising from a heat source in the low-temperature unit is absorbed via part of the duct by the exhaust air passing through the air flow passage created inside the duct and discharged thereby, thus making it possible to reliably prevent temperature rise in the low-temperature unit due to the heat arising from the heat source.

According to the above fourth feature of the present invention, heat arising from a heat source in the low-temperature unit is absorbed via the high thermally conductive portion of the duct by the exhaust air passing through the air flow passage created inside the duct and discharged thereby, thus making it possible to efficiently discharge the heat arising from the heat source together with the exhaust air and hence reliably prevent temperature rise in the low-temperature unit.

According to the above fifth feature of the present invention, the heat source of the low-temperature unit is accommodated in the depressed portion formed on the top surface of the duct, so that the whole surface of the area of the heat source exposed from the bottom surface of the low-temperature unit is placed opposite to the inner surface of the depressed portion formed on the top surface of the duct. Therefore, heat arising from the heat source can be efficiently absorbed via the depressed portion of the duct by the exhaust air, thus making it possible to reliably prevent temperature rise in the low-temperature unit due to the heat arising from the heat source.

According to the above sixth feature of the present invention, heat transmitted from a heat source of the low-temperature unit to the upper portion of the duct is absorbed via the radiating portion by the exhaust air, so that the heat transmitted to the top surface of the duct can be efficiently absorbed by the exhaust air, thus making it possible to reliably prevent temperature rise in the low-temperature unit due to the heat arising from the heat source.

According to the above seventh feature of the present invention, in the interior of the duct located between the high-temperature unit and the low-temperature unit, a radiating portion is formed on the surface parallel to the direction of the arrangements of the high-temperature unit and the low-temperature unit. Therefore, heat transmitted from the high-temperature unit to the duct whilst being transmitted from the high-temperature unit side to the low-temperature unit side in the duct, can be absorbed via the radiating portion by the exhaust air, thus making it possible to inhibit the heat from transmitting to the low-temperature unit via the duct and hence prevent temperature rise of the low-temperature unit.

According to the above eighth feature of the present invention, an insulating portion is provided to stop conduction of heat arising from the high-temperature unit to the duct so that no heat from the high-temperature unit will be absorbed via the duct by the exhaust air and discharged thereby, thus making it possible to reliably prevent reduction of the temperature of the high-temperature unit.

According to the above ninth feature of the present invention, by configuring part of the frame from the duct, the frame supporting the units including the high-temperature unit and low-temperature unit can be reinforced by the duct to improve the strength of the apparatus with fewer elements constituting the frame and hence making the apparatus compact.

According to the above tenth feature of the present invention, the units including the high-temperature unit and low-temperature unit are supported by the duct and the frame, which are, at least, partially composed of a high thermally conductive material. Therefore, excessive heat from the high-temperature unit and from the low-temperature unit can be efficiently transmitted to the duct and the frame, thus making it possible to prevent temperature rise of the whole apparatus.

What is claimed is:

1. A cooling system for an image forming apparatus comprising:

a laser writing unit disposed above a fixing unit; and a duct having an air flow passage for exhaust, wherein the whole or part of the duct is arranged between the fixing unit and the laser writing unit, the laser writing unit includes a motor which is a heat source for rotating a polygon mirror, and from a bottom portion of the laser writing unit, the motor or a radiating portion placed in contact with the motor is protruded downward into the air flow passage.

2. The cooling system for an image forming apparatus according to claim 1, wherein an insulating portion is disposed between the duct and the fixing unit.

3. The cooling system for an image forming apparatus according to claim 1, wherein the duct constitutes part of a frame supporting the units including the fixing unit and laser writing unit.

4. The cooling system for an image forming apparatus according to claim 1, wherein the laser writing unit is placed in contact with the duct.

5. A cooling system for an image forming apparatus comprising:

a laser writing unit disposed above a fixing unit; and a duct having an air flow passage for exhaust, wherein the whole or part of the duct is arranged between the fixing unit and the laser writing unit, the laser writing unit includes a motor which is a heat source for rotating a polygon mirror, and wherein from a bottom portion of the laser writing unit, the motor or a radiating portion placed in contact with the motor is protruded downward into the air flow passage and the air flow passage is formed between a side of the laser writing unit oppositely facing the fixing unit and an interior surface of the duct.

* * * * *